(12) United States Patent
Jang

(10) Patent No.: US 10,787,164 B2
(45) Date of Patent: Sep. 29, 2020

(54) SYSTEM AND METHOD OF CONTROLLING VEHICLE IN COLD START

(71) Applicants: HYUNDAI MOTOR COMPANY, Seoul (KR); KIA MOTORS CORPORATION, Seoul (KR)

(72) Inventor: Hwa Yong Jang, Hwaseong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 376 days.

(21) Appl. No.: 15/836,717

(22) Filed: Dec. 8, 2017

(65) Prior Publication Data
US 2019/0118793 A1 Apr. 25, 2019

(30) Foreign Application Priority Data
Oct. 25, 2017 (KR) ........................ 10-2017-0139162

(51) Int. Cl.
*B60W 20/16* (2016.01)
*F01N 3/20* (2006.01)
(Continued)

(52) U.S. Cl.
CPC ......... *B60W 20/16* (2016.01); *B01D 53/9418* (2013.01); *B01D 53/9495* (2013.01);
(Continued)

(58) Field of Classification Search
CPC ............ B01D 53/9418; B01D 53/9495; B01D 53/9459; B60K 6/485; B60L 15/20; B60L 2270/12; B60W 10/06; B60W 10/08; B60W 20/16; B60W 30/18054; B60W 2510/0642; B60W 2510/068; B60W 2540/10; B60W 2710/0616; B60W 2710/083;
(Continued)

(56) References Cited

U.S. PATENT DOCUMENTS 5,628,186 A * 5/1997 Schmelz ................ B01D 53/30
60/274
6,311,484 B1 * 11/2001 Roth .................. B01D 53/9431
60/301
(Continued)

FOREIGN PATENT DOCUMENTS

JP 3992933 B2 10/2007
JP 2010133354 A * 6/2010
(Continued)

OTHER PUBLICATIONS

Upadhyay et al., "Robust Separation of Signal Domain From Single Channel Mixed Signal Output of Automotive Urea Based Selective Catalytic Reduction Systems", Journal of Dynamic Systems, Measurement, and Control, Jan. 2014, vol. 136, pp. 011012-1-011012-9.

*Primary Examiner* — Spencer D Patton
(74) *Attorney, Agent, or Firm* — Morgan, Lewis & Bockius LLP

(57) ABSTRACT

A method for controlling a hybrid vehicle for a cold start. The method includes determining whether a combustion engine of the vehicle is idling. The method further includes, when the engine is idling, increasing a load of a hybrid starter/generator (HSG) until a selective catalytic reduction (SCR) catalyst reaches a desirable temperature.

10 Claims, 3 Drawing Sheets

(51) Int. Cl.
*F01N 3/021* (2006.01)
*B01D 53/94* (2006.01)
*B60L 15/20* (2006.01)
*B60W 10/06* (2006.01)
*B60W 10/08* (2006.01)

(52) U.S. Cl.
CPC ............. *B60L 15/20* (2013.01); *B60W 10/06* (2013.01); *B60W 10/08* (2013.01); *F01N 3/021* (2013.01); *F01N 3/208* (2013.01); *F01N 3/2066* (2013.01); *B60L 2270/12* (2013.01); *B60W 2510/068* (2013.01); *B60W 2510/0642* (2013.01); *B60W 2540/10* (2013.01); *B60W 2710/0616* (2013.01); *B60W 2710/083* (2013.01); *F01N 2560/026* (2013.01); *F01N 2560/06* (2013.01); *F01N 2560/08* (2013.01); *F01N 2590/11* (2013.01); *F01N 2610/02* (2013.01); *F01N 2610/146* (2013.01); *F01N 2900/1602* (2013.01); *Y10S 903/93* (2013.01)

(58) Field of Classification Search
CPC ... B60W 30/192; B60W 30/194; F01N 3/021; F01N 3/2066; F01N 3/208; F01N 2560/026; F01N 2560/06; F01N 2560/08; F01N 2590/11; F01N 2610/02; F01N 2610/1453; F01N 2610/146; F01N 2900/1602; F01N 3/206; F01N 3/18; Y10S 903/93

USPC .......................................................... 701/22
See application file for complete search history.

(56) References Cited

U.S. PATENT DOCUMENTS

| | | | |
|---|---|---|---|
| 9,321,455 B2* | 4/2016 | Kim | B60W 20/40 |
| 9,447,743 B2* | 9/2016 | Nagaoka | F02D 41/024 |
| 2009/0199560 A1* | 8/2009 | Maier | B60K 6/485 |
| | | | 60/700 |
| 2009/0235646 A1* | 9/2009 | Nagaoka | B01D 53/9409 |
| | | | 60/286 |
| 2010/0276223 A1* | 11/2010 | Gonze | B01D 53/9409 |
| | | | 180/309 |
| 2012/0047879 A1* | 3/2012 | Ujihara | B01D 53/9409 |
| | | | 60/287 |
| 2014/0058596 A1* | 2/2014 | Martin | B60W 50/0205 |
| | | | 701/22 |
| 2015/0322834 A1* | 11/2015 | Haba | F01N 3/0871 |
| | | | 60/285 |

FOREIGN PATENT DOCUMENTS

| | | | |
|---|---|---|---|
| JP | 2017-94985 A | | 6/2017 |
| JP | 2017094985 A | * | 6/2017 |
| KR | 10-0986488 B1 | | 10/2010 |

* cited by examiner

SYSTEM AND METHOD OF CONTROLLING VEHICLE IN COLD START

CROSS-REFERENCE TO RELATED APPLICATION

This application claims priority to and the benefit of Korean Patent Application No. 10-2017-0139162 filed in the Korean Intellectual Property Office on Oct. 25, 2017, the entire contents of which are incorporated herein by reference.

BACKGROUND

(a) Field

The present disclosure relates to a vehicle control system and method at the time of a cold start.

(b) Description of the Related Art

A typical vehicle is driven using energy generated by burning an air-fuel mixture. Recently, in order to respond to enhanced exhaust regulations and improve fuel efficiency, usage of hybrid vehicles is increasing.

The hybrid vehicle means a vehicle using two or more power sources. Generally, the hybrid vehicle includes an internal combustion engine which is driven by burning fossil fuel and a motor which is driven by electrical energy stored in a battery as power sources.

As a 48 V battery is applied to the vehicle, an interest in a mild hybrid vehicle is increasing. The mild hybrid vehicle uses the engine as a main power source and uses the motor to assist the engine. In other words, the motor of the mild hybrid vehicle is normally connected to the engine to start the engine, assists with the torque while driving the engine, and charges the battery using the remaining energy when the engine is driven.

In the meantime, the exhaust gas generated during the combustion process contains various materials (for example, hydrocarbon, carbon dioxide, or nitrogen oxide) and some of the various materials contained in the exhaust gas need to be removed to meet the environmental regulations.

The above information disclosed in this Background section is only for enhancement of understanding of background of the invention. Applicant notes that this section may contain information available before this application. However, by providing this section, Applicant does not admit that any information contained in this section constitutes prior art.

SUMMARY

Generally, the exhaust gas which is discharged through an exhaust manifold in the engine is guided to a catalytic converter installed in an exhaust pipe to be purified, passes through a muffler to attenuate a noise, and then is discharged to the atmosphere through a tail pipe. The catalytic converter purifies contaminants contained in the exhaust gas. Further, a soot filter for collecting particulate matters (PM) contained in the exhaust gas is mounted on the exhaust pipe.

A denitrification catalyst (DeNOx catalyst) is one of catalytic converters which purifies nitrogen oxide (NOx) contained in the exhaust gas. When a reducing agent such as urea, ammonia, carbon monoxide, and hydrocarbon (HC) is provided to the exhaust gas, nitrogen oxide contained in the exhaust gas is reduced through an oxidation-reduction reaction with the reducing agent in the denitrification catalyst.

A selective catalytic reduction (SCR) catalyst is one of the denitrification catalyst. Recently, as the regulations of the exhaust gas are enhanced, the usage of the SCR catalyst is increasing. The SCR catalyst operates well at a predetermined temperature range (approximately, 250° C. to 400° C.). However, there is a problem in that the SCR catalyst cannot remove the nitrogen oxide at a low temperature range and excessively decomposes the nitrogen oxide at a high temperature range to discharge ammonia.

Particularly, since most of nitrogen oxide discharged from the vehicle is exhausted at the beginning of a start of the engine, rapid heating of the engine is very important to reduce emission.

The present disclosure has been made in an effort to provide a vehicle control system and method at the time of a cold start which increases a load of an HSG when an engine is in an idle state and a temperature of an SCR catalyst is low at the time of a cold start to shorten a heating time of an engine and assists an engine torque using an HSG when the engine is driven not in an idle state and nitrogen oxide needs to be purified, to improve fuel efficiency.

A vehicle control system according to an embodiment of the present invention includes: an engine including a combustion chamber configured to generate energy by burning an air-fuel mixture, an intake manifold configured to supply air to the combustion chamber, an injector configured to supply a fuel to the combustion chamber and an exhaust manifold configured to discharge exhaust gas generated by burning the air-fuel mixture to an exhaust pipe; a hybrid starter/generator (HSG) configured to start the engine or generate electricity using energy generated in the engine; an injection module which is mounted in the exhaust pipe and injects a reducing agent to the exhaust gas; a selective catalytic reduction (SCR) catalyst which is mounted in the exhaust pipe at a rear end of the injection module and reduces nitrogen oxide contained in the exhaust gas using the reducing agent; and a controller which controls operations of the injector, the injection module, and the HSG in which when a state of the engine is an idle state at the time of a cold start, the controller increases a load of the HSG by a predetermined load amount until a temperature of the SCR catalyst reaches a predetermined temperature.

The predetermined load amount may vary depending on a difference between the temperature of the SCR catalyst and the predetermined temperature.

The larger the difference between the temperature of the SCR catalyst and the predetermined temperature is, the larger the predetermined load amount is.

The difference between the temperature of the SCR catalyst and the predetermined temperature may be divided into two or more temperature difference sections and the predetermined load amount in any one temperature difference section may be constant.

When the engine operates at the time of the cold start, the controller may determine whether an amount of nitrogen oxide contained in the exhaust gas is larger than a reference amount and when the amount of nitrogen oxide contained in the exhaust gas is larger than the reference amount, the controller may control the injection module to inject a reducing agent according to the amount of nitrogen oxide.

The controller may control the HSG to generate at least some of a demand torque of a driver before injecting the reducing agent.

A vehicle control method according to another embodiment of the present invention includes: determining an engine state when a cold starting condition is satisfied; determining whether a temperature of the SCR catalyst is lower than a first temperature when the engine is in an idle state; and increasing a load of the HSG by a first load when the temperature of the SCR catalyst is lower than the first temperature.

When the temperature of the SCR catalyst is equal to or higher than the first temperature, the method may further include: determining whether the temperature of the SCR catalyst is higher than a second temperature; increasing the load of the HSG by a second load which is smaller than the first load when the temperature of the SCR catalyst is equal to or lower than the second temperature; and returning to the determining whether the temperature of the SCR catalyst is lower than the first temperature.

When the temperature of the SCR catalyst is higher than the second temperature, the method may further include: returning to the determining of an engine state.

The method may further include: additionally injecting the fuel when the engine is in an idle state.

When the engine operates not in an idle state, the method may further include: determining whether an amount of nitrogen oxide contained in the exhaust gas is larger than a reference amount; calculating a reducing agent injecting amount according to the amount of nitrogen oxide when the amount of nitrogen oxide contained in the exhaust gas is larger than the reference amount; and injecting the reducing agent according to the calculated reducing agent injecting amount.

When an amount of nitrogen oxide contained in the exhaust gas is larger than the reference amount, the method may further include: generating at least some of a demand torque of a driver by the HSG before the injecting of a reducing agent.

According to the embodiment of the present invention, when the engine is in an idle state and a temperature of the SCR catalyst is low at the time of a cold start, a load of the HSG is increased to shorten a heating time of the engine.

Further, when the engine is driven not in an idle state and nitrogen oxide needs to be purified, the engine torque is assisted using the HSG, to improve fuel efficiency.

In addition, effects which may be obtained or predicted by the embodiment of the present invention will be directly or implicitly disclosed in the detailed description of the embodiment of the present invention. That is, various effects predicted according to the embodiment of the present invention will be disclosed in the detailed description which will be described below.

DETAILED DESCRIPTION

Figure 1:
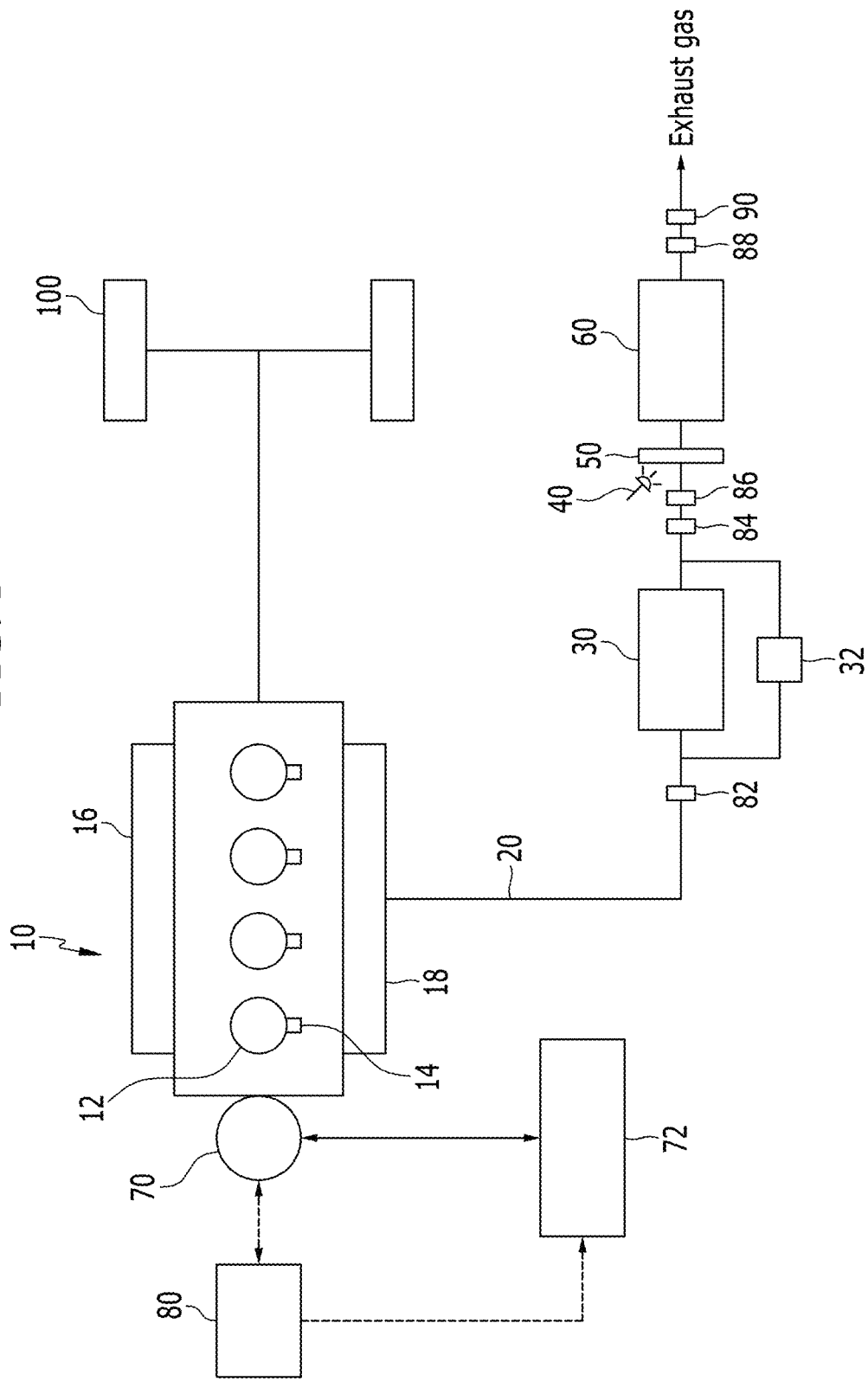
FIG. 1 is a schematic diagram of a vehicle control system according to an embodiment of the present invention.

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

The drawings and description are to be regarded as illustrative in nature and not restrictive and like reference numerals designate like elements throughout the specification.

In the following description, dividing names of components into first, second and the like is to divide the names because the names of the components are the same as each other and an order thereof is not particularly limited.

Terms used in the specification are used for describing only specific embodiments, but not intended to limit the present invention. As used in the specification, singular forms are intended to include plural forms unless explicitly described to the contrary. Terms "includes" and/or "including" used in the specification specify the presence of features, integers, steps, operations, constituent elements, and/or components, but need to be understood not to exclude one or more other features, integers, steps, operations, constituent elements, components, and/or a group thereof. As used in the specification, a term "and/or" includes arbitrary and all combinations of one or more associated listed items. A term "coupled" represents a physical relationship between two components and the components are directly connected with each other or indirectly connected with each other through at least one intermediate component.

As used in the specification, it is understood that "vehicle", "vehicular" or other similar term includes automobiles, generally, passenger automobiles including sport utility vehicles (SUV), buses, trucks, various commercial vehicles, vessels including various boats and ships, and airplanes and also includes a hybrid vehicle, an electric vehicle, a hybrid electric vehicle, a hydrogen powered vehicle, and other alternative fuel (fuels induced from resources other than petroleum) vehicles. As mentioned in the specification, the electric vehicle (EV) is a part of locomotion capabilities and is a vehicle including electrical power obtained from a chargeable energy storage device (for example, one or more rechargeable electrochemical cell or other type of battery). The EV is not limited to a vehicle but includes motor cycles, carts, and scooters. Further, the hybrid vehicle is a vehicle having two or more power sources, for example, a gasoline based power and an electricity based power (for example, hybrid electric vehicle (HEV)).

Additionally, one or more following methods or aspects thereof may be performed by at least one controller, a controller area network (CAN) bus, or a vehicle network. The controller, the controller area network (CAN) bus, or a vehicle network may be implemented in the vehicle described in the specification. A term "controller" may refer to a hardware device including a memory and a processor. The memory is configured to store program commands and the processor is specifically programmed to execute program commands which performs at least one process which will be described below. Moreover, as they will be described in more detail below, the following methods may be performed by a system including the controller by being connected to at least one additional component.

Further, the method of the present specification may be implemented as a non-transitory computer readable storage medium on a computer readable storage medium including executable program commands which are executed by a processor or a controller. Examples of the computer readable storage media include a ROM, a RAM, compact disk (CD) ROMs, magnetic tapes, floppy disks, flash drivers, smart cards, and optical data storage devices, but are not limited thereto. The computer readable storage media may be distributed to a network coupled to computer systems to be stored and executed to be distributed by a telematics server or a controller area network (CAN).

An aspect of the present invention provides a method for controlling a motor/generator (HSG, 70) after a cold start of a hybrid vehicle. Subsequent to a cold start of the vehicle, at least one controller of the vehicle determines (1) whether combustion engine 10 is idling or not, and (2) whether temperature of SCR catalyst unit 60 is lower than a first predetermined temperature (a lower limit of a desirable working range of SCR catalyst unit 60).

Subsequently, when the engine 10 is cold (at a temperature lower than a predetermined temperature) and idling and when the temperature of SCR catalyst unit 60 is lower than the first predetermined temperature, the controller of the vehicle causes the motor/generator 70 to operate at a first load level that is higher than a normal load level (by activating a clutch to engage the HSG 70 and the engine 10, and/or by placing a negative torque command for the HSG 70). In embodiments, the HSG 70 operates at a normal load level when the engine is idling and the temperature of SCR catalyst unit is within the desirable working range.

Subsequently, when the temperature of SCR catalyst unit 60 reaches the desirable range and the engine is still idling, the controller causes the motor/generator 70 to operate at a second load level lower than the first load level. In embodiments, when the engine stops idling (and starts to drive the vehicle) in response to the driver's input on an acceleration pedal, the controller (1) causes the motor/generator 70 to operate at a third load level (for generating an assist torque in addition to torque from the engine) even when the SCR catalyst unit 60 reaches its desirable working temperature, and (2) controls the injector 40 to spray a reducing agent to exhaust gas if NOx level is higher than a predetermined reference. In embodiments, the third load level is lower than the first load level.

In embodiments, when the engine 10 is cold (at a temperature lower than a predetermined temperature) and idling, the injector 40 does not operate to spray a reducing agent to exhaust gas, regardless of NOx level, while the motor/generator 70 is operating at the first load level for rapid heating of the SCR catalyst unit 60. In other embodiments, the injector 40 sprays the reducing agent to exhaust gas while the engine is idling if the temperature of SCR catalyst has not reached the desirable working range after a cold start.

FIG. 1 is a schematic diagram of a vehicle control system according to an embodiment of the present invention.

As illustrated in FIG. 1, a vehicle control system according to an embodiment of the present invention includes an engine 10, an exhaust pipe 20, a soot filter 30, an injection module 40, a selective catalytic reduction (SCR) catalyst 60, a hybrid starter/generator (HSG), a battery 72, and a controller 80.

Here, it is exemplified that the HSG is a mild hybrid starter/generator (MHSG). However, the HSG is not limited to the MHSG and a conventional HSG is sufficient if the HSG performs a function of an HSG according to an embodiment of the present invention.

The engine 10 converts chemical energy into mechanical energy by burning an air-fuel mixture. The engine 10 is connected to an intake manifold 16 to introduce the air into a combustion chamber 12 and the exhaust gas generated during a combustion process is collected in an exhaust manifold 18 and then discharged to the outside of the engine 10. An injector 14 is mounted in the combustion chamber 12 to inject the fuel into the combustion chamber 12.

Here, a diesel engine is exemplified, but a lean burn gasoline engine may also be used. When the gasoline engine is used, the air-fuel mixture flows into the combustion chamber 12 through the intake manifold 16 and a spark plug is mounted above the combustion chamber 12 for ignition. Further, when a gasoline direct injection (GDI) engine is used, similarly to the diesel engine, the injector 14 is mounted above the combustion chamber 12.

The mechanical energy generated in the engine 10 is transmitted to wheels 100 through a transmission to drive the vehicle.

The exhaust pipe 20 is connected to the exhaust manifold 18 to discharge the exhaust gas to the outside of the vehicle. The soot filter 30, the injection module 40, and the SCR catalyst 60 are mounted on the exhaust pipe 20 to remove hydrocarbon, carbon monoxide, particulate materials, and nitrogen oxide contained in the exhaust gas.

The soot filter 30 is mounted in the exhaust pipe 20 at a rear end of the engine 10 and collects particulate matters contained in the exhaust gas. Normally, the soot filter 30 includes a plurality of inlet channels and outlet channels. One end of the inlet channel is open and the other end thereof is closed so that the exhaust gas flows from the front end of the soot filter 30 therein. Further, an end of the outlet channel is closed and the other end thereof is open so that exhaust gas in the soot filter 30 is discharged. The exhaust gas flowing in the soot filter 30 through the inlet channel enters the outlet channel through a porous wall which divides the inlet channel and the outlet channel and then is discharged from the soot filter 30 through the outlet channel. The particulate materials (that is, soot) contained in the exhaust gas is collected while the exhaust gas passes through the porous wall.

In the meantime, a differential pressure sensor 32 is mounted in the exhaust pipe 20. The differential pressure sensor 32 measures a pressure difference between a front end and a rear end of the soot filter 60 and transmits a signal corresponding thereto to the controller 80. When a pressure difference measured by the differential pressure sensor 32 is equal to or higher than a predetermined pressure, the controller 80 controls the soot filter 30 to be regenerated. In this case, the injector 14 post-injects the fuel to burn the particulate matters collected in the soot filter 30. When a temperature of the exhaust gas which passes through the soot filter 30 is low, the controller 80 increases a load of the MHSG 70 to heat the exhaust gas.

A first temperature sensor 82 is mounted in the exhaust pipe 20 in the front side of the soot filter 30 to detect a temperature of exhaust gas flowing to the soot filter 30. Further, a second temperature sensor 84 is mounted in a rear exhaust pipe 20 of the soot filter 30 to detect a temperature of the exhaust gas discharged from the soot filter 30.

Here, it is exemplified that the first and second temperature sensors 82 and 84 are disposed in a front side and a rear side of the soot filter 30. However, the embodiment of the present invention is not limited to using both the first and second temperature sensors 82 and 84, but only any one of the first and second temperature sensors 82 and 84 may be used. Further, a temperature of the soot filter 30 may mean a temperature of the exhaust gas which passes through the soot filter 30 and may be determined based on any one of a measurement value of the first temperature sensor 82, a measurement value of the second temperature sensor 84, and measurement values of the first and second temperature sensors 82 and 84.

The injection module 40 is mounted in the exhaust pipe 20 at a rear end of the soot filter 30 and is controlled by the controller 80 to inject a reducing agent to the exhaust gas. Normally, the injection module 40 injects urea and the injected urea is converted into ammonia by hydrolysis. However, the reducing agent is not limited to ammonia.

A mixer 50 is mounted in the exhaust pipe 20 at a rear end of the injection module 40 to uniformly mix the reducing agent with the exhaust gas.

The SCR catalyst 60 is mounted in the exhaust pipe 20 at the rear end of the soot filter 30 and reduces nitrogen oxide contained in the exhaust gas using the reducing agent injected from the injection module 40.

A first NOx sensor 86 is mounted in the exhaust pipe 20 in the front side of the SCR catalyst 60. The first NOx sensor 86 measures an amount of nitrogen oxide contained in the exhaust gas flowing to the SCR catalyst 60 to transmit a signal corresponding thereto to the controller 80. The amount of NOx measured by the first NOx sensor 86 may be used to determine an amount of reducing agent to be injected from the injection module 40.

Further, a third temperature sensor 88 and a second NOx sensor 90 are mounted in the exhaust pipe 20 in the rear end of the SCR catalyst 60.

The third temperature sensor 88 detects a temperature of the exhaust gas discharged from the SCR catalyst 60. Here, it is exemplified that the second and third temperature sensors 84 and 88 are disposed in the front side and the rear side of the SCR catalyst 60. However, the embodiment of the present invention is not limited to use both the second and third temperature sensors 84 and 88, but only any one of the second and third temperature sensors 84 and 88 may be used. Further, a temperature of the SCR catalyst 60 may mean a temperature of the exhaust gas which passes through the SCR catalyst 60 and may be determined based on any one of a measurement value of the second temperature sensor 84, a measurement value of the third temperature sensor 88, and measurement values of the second and third temperature sensors 84 and 88.

The second NOx sensor 90 detects an amount of nitrogen oxide contained in the exhaust gas discharged from the SCR catalyst 60 and transmits a signal corresponding thereto to the controller 80. The controller 80 may monitor whether the SCR catalyst 60 normally removes nitrogen oxide contained in the exhaust gas based on a detected value of the second NOx sensor 90. That is, the second NOx sensor 90 may be used to evaluate a performance of the SCR catalyst 60.

The MHSG 70 is mounted on one side of the engine 10 and selectively or continuously connected to a crankshaft of the engine 10. The MHSG 70 rotates the crankshaft using electrical energy of the battery 72 to start the engine 10 and to assist the torque while driving the engine 10. Further, the MHSG 70 generates electricity using the energy generated in the engine 10 and charges the battery 72 with the generated electricity.

The battery 72 supplies electricity to electric components of the vehicle. Particularly, the battery 72 supplies the electrical energy to the MHSG 70 to start the engine 10 or assist the torque of the engine 10. Further, the battery 72 may be charged by the electrical energy generated in the MHSG 70. The battery 72 may include a 48 V battery, but is not limited thereto.

The controller 80 determines a driving condition of the engine 10 based on signals detected by sensors and controls operations of the engine 10 and the MHSG 70 based on the driving condition of the engine 10. Further, the controller 80 calculates a soot amount collected by the soot filter 30 and controls the soot filter 30 to be regenerated when the soot amount is equal to or larger than a predetermined amount. Further, when the regeneration of the soot filter 30 starts, if the temperature of the soot filter 30 is low, the controller 80 controls the MHSG 70 to heat the soot filter 30. Further, the controller 80 calculates an amount of nitrogen oxide contained in the exhaust gas. When the amount of nitrogen oxide is larger than a reference amount, the controller 80 calculates an amount of reducing agent injected and controls the injection module 40 to inject the reducing agent according to the amount of reducing agent injected.

In the meantime, a plurality of maps and a plurality of models defining characteristics of the SCR catalyst 60 are stored in the controller 80. The controller 80 calculates an amount of ammonia adsorbed in the SCR catalyst 60 based on the maps and the models and adjusts the amount of reducing agent injected according to an amount of ammonia adsorbed on the SCR catalyst 60. The plurality of maps and the plurality of models may be determined by a large number of experiments.

To this end, the controller 80 may be implemented by at least one processor operated by a predetermined program and the predetermined program may be programmed to perform each step of the vehicle control method according to the embodiment of the present invention.

Figure 2:
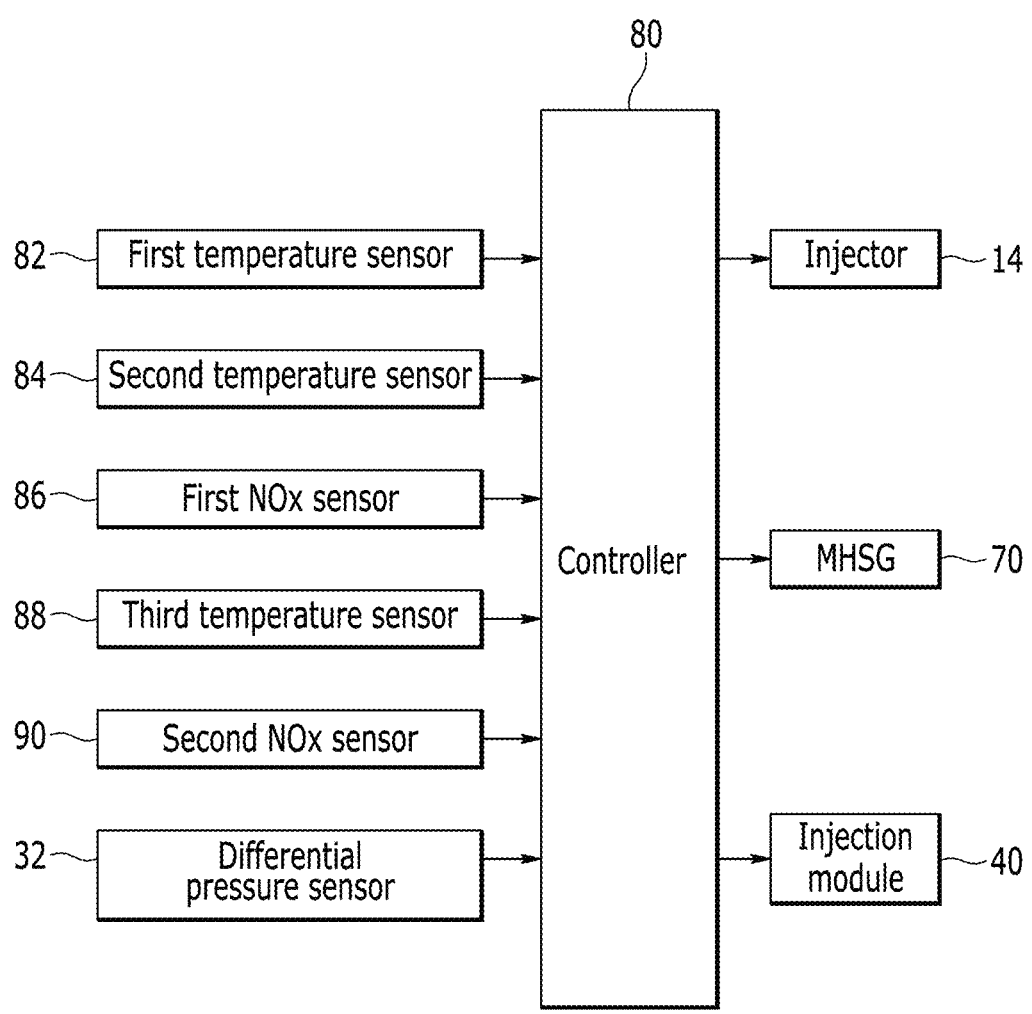
FIG. 2 is a block diagram illustrating a relationship between of an input and an output of a controller used for a vehicle control method according to an embodiment of the present invention.

FIG. 2 is a block diagram illustrating a relationship between an input and an output of a controller used for a vehicle control method according to an embodiment of the present invention.

As illustrated in FIG. 2, the first temperature sensor 82, the second temperature sensor 84, the first NOx sensor 86, the third temperature sensor 88, the second NOx sensor 90, and the differential pressure sensor 32 are electrically connected to the controller 80 and transmit detected values to the controller 80.

The first temperature sensor 82 detects a temperature of the exhaust gas flowing to the soot filter 30 to transmit a signal corresponding thereto to the controller 80.

The second temperature sensor 84 measures a temperature of the exhaust gas discharged from the soot filter 30 to transmit a signal corresponding thereto to the controller 80.

The first NOx sensor 86 measures an amount of NOx contained in the exhaust gas flowing to the SCR catalyst 60 to transmit a signal corresponding thereto to the controller 80.

The third temperature sensor 88 measures a temperature of the exhaust gas discharged from the SCR catalyst 60 to transmit a signal corresponding thereto to the controller 80.

The second NOx sensor 90 detects an amount of nitrogen oxide contained in the exhaust gas discharged from the SCR catalyst and transmits a signal corresponding thereto to the controller 80.

The differential pressure sensor 32 measures a pressure difference between a front end and a rear end of the soot filter 30 and transmits a signal corresponding thereto to the controller 80.

The controller 80 determines an engine driving condition, a fuel injection amount, a fuel injecting timing, a fuel injecting pattern, a reducing agent injecting amount, a regenerating timing of the soot filter 30, and a charging amount of the MHSG 70 based on the transmitted values and outputs signals for controlling the injector 14, the injection module 40, and the MHSG 70 to the injector 14, the injection module 40, and the MHSG 70. Further, the controller 80 calculates an amount of ammonia adsorbed on the SCR catalyst 60 based on the transmitted values and calculates an amount of reducing agent to be injected from the injection module 40 based on the amount of ammonia.

In the meantime, a plurality of sensors may be mounted in the vehicle control system according to the embodiment of the present invention other than the sensors described with reference to FIG. 2, but description thereof will be omitted for the convenience of description.

Further, positions of the sensors may vary as needed and are not limited to the positions illustrated in FIG. 1.

Figure 3:
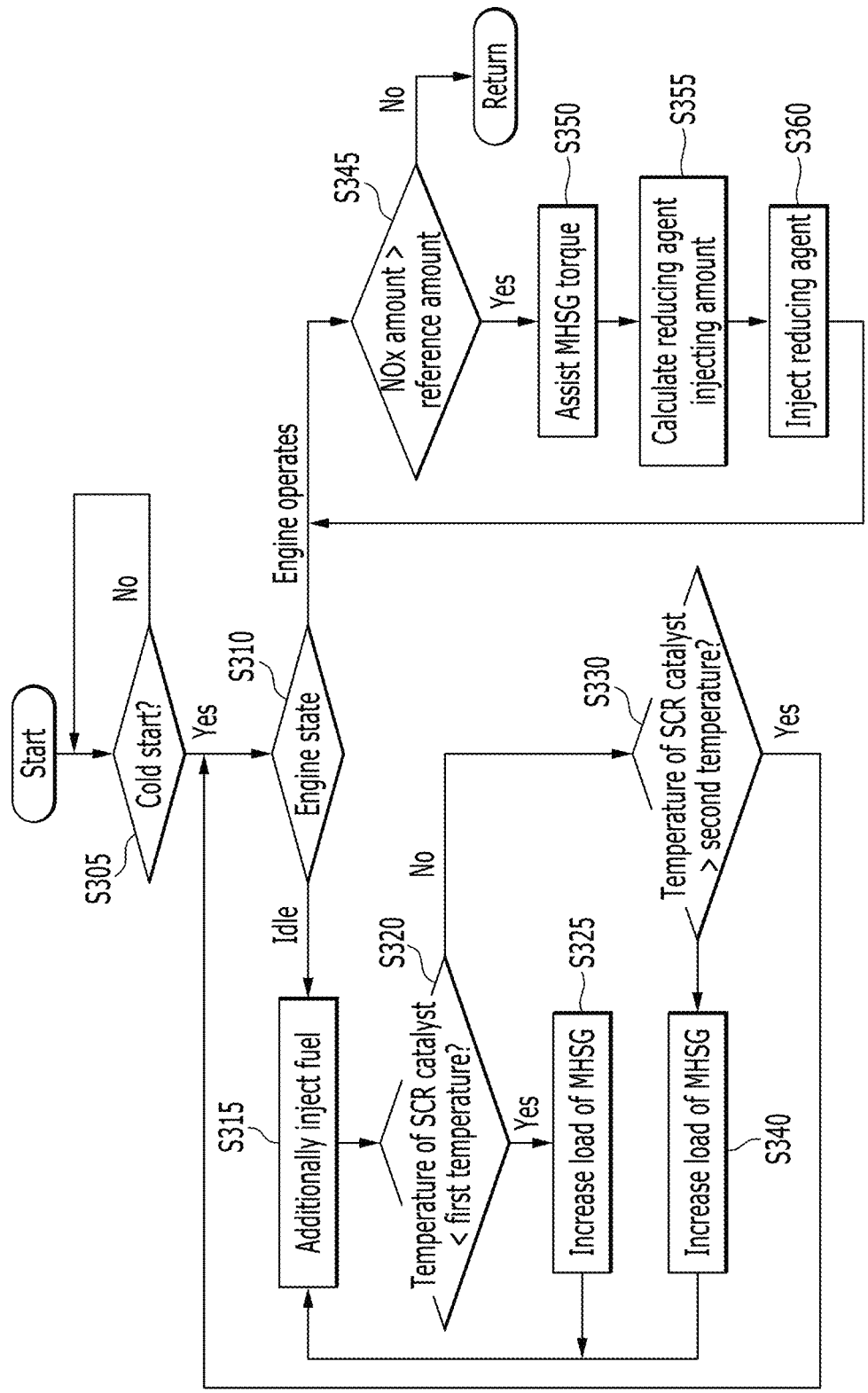
FIG. 3 is a flowchart of a vehicle control method according to an embodiment of the present invention.

FIG. 3 is a flowchart of a vehicle control method according to an embodiment of the present invention.

As illustrated in FIG. 3, a vehicle control method according to an embodiment of the present invention starts by determining whether to satisfy a cold starting condition of an engine 10 at step S305. That is, the controller 80 determines whether a torque of the engine 10 is necessary in a state when the engine 10 is not heated. For example, the cold starting condition is satisfied when starting of the engine 10 is required and a temperature of a coolant is lower than a predetermined temperature. In embodiments, the engine is cold when temperature of engine coolant is lower than a predetermined temperature, or a temperature of the engine is lower than a predetermined temperature.

At the step S305, the controller 80 continuously determines whether the cold starting condition is satisfied. When the cold starting condition is satisfied at the step S305, the controller 80 starts the engine 10 and determines a state of the engine 10 at step S310. That is, the controller 80 determines whether the engine 10 is an idle state or the engine 10 operates not in an idle state (driving the vehicle).

When the engine 10 operates in an idle state at the step S310, the controller 80 controls the injector 14 to additionally inject the fuel at step S315. That is, the controller 80 controls the injector 14 to inject more fuel in addition to fuel for adjusting a required torque of the engine 10 according to a predetermined map.

Further, the controller 80 checks a temperature of the SCR catalyst 60. That is, the controller 80 checks a difference between the temperature of the SCR catalyst 60 and a predetermined temperature to determine whether the temperature of the SCR catalyst 60 is sufficient to efficiently remove the nitrogen oxide. In the embodiment of the present invention, the difference between the temperature of the SCR catalyst 60 and the predetermined temperature is divided into three temperature difference sections and the controller 80 controls the engine 10 and the MHSG 70 according to the same control strategy in each temperature difference section. However, the number of temperature difference sections is not limited to three. Further, the controller 80 may continuously control the engine 10 and the MHSG 70 according to the difference between the temperature of the SCR catalyst 60 and the predetermined temperature.

As illustrated in FIG. 3, the controller 80 determines whether the temperature of the SCR catalyst 60 is included in a first temperature difference section. In other words, the controller 80 determines whether the temperature of the SCR catalyst 60 is lower than a first temperature at step S320. When the temperature of the SCR catalyst 60 is lower than the first temperature at the step S320, the controller 80 increases the load of the MHSG 70 by a first load at step S325. Normally, the controller 80 controls the injector 14 to inject a fuel according to a predetermined map in order to meet a torque requested by the driver. However, when the load of the MHSG 70 is increased, the load of the MHSG 70 acts as a frictional force. Therefore, the controller 80 controls the injector 14 to inject more fuel in order to meet the torque demanded by the driver. Therefore, the temperature of the exhaust gas sharply increases. In the meantime, as a method of increasing the load of the MHSG 70, a clutch which selectively connects the crankshaft of the engine 10 and a shaft of the MHSG 70 is operated (to engage the crankshaft and the shaft of the MHSG) or a negative torque command may be instructed to the MHSG 70. However, the method of increasing the load of MHSG 70 is not limited to those exemplified and may use an appropriate method among various methods known to a person of ordinary skill in the art.

After performing the step S325, the controller 80 returns to the step S315.

At the step S320, when the temperature of the SCR catalyst 60 is equal to or higher than the first temperature, the controller 80 determines whether the temperature of the soot filter 30 is included to the second temperature difference section or the third temperature difference section. In other words, the controller 80 determines whether the temperature of the SCR catalyst 60 is higher than the second temperature at step S330. When the temperature of the SCR catalyst 60 is equal to or lower than the second temperature at the step S330, the controller 80 increases the load of the MHSG 70 by a second load at step S340. The second load is smaller than the first load. Next, the controller 80 returns to the step S315.

When the temperature of the SCR catalyst 60 is higher than the second temperature at the step S330, the controller 80 returns to the step S310 to determine the state of the engine.

When the engine 10 operates not in an idle state at the step S310, the controller 80 changes a load of the MHSG 70 to an initial value (for example, 0) and determines whether the amount of nitrogen oxide contained in the exhaust gas is larger than a reference amount at step S345.

When the amount of nitrogen oxide contained in the exhaust gas is equal to or smaller than the reference amount at the step S345, the controller 80 completes the vehicle control method according to the present embodiment.

When the amount of nitrogen oxide contained in the exhaust gas is larger than the reference amount at the step S345, the controller assists the torque of the engine 10 using the MHSG 70 at step S350. In other words, the controller 80 causes the MHSG 70 to generate a part of a target torque and reduce torque from the engine 10. Therefore, since the fuel injecting amount is reduced, the fuel efficiency is improved.

Further, the controller 80 calculates a reducing agent injecting amount to be injected by the injection module 40. The reducing agent injecting amount may be calculated according to an amount of ammonia adsorbed on the SCR catalyst 60, an amount of nitrogen oxide contained in the exhaust gas, the temperature of the SCR catalyst 60, and a degradation factor of the SCR catalyst 60. A method of calculating the reducing agent injecting amount is well known to a person of ordinary skill in the art so that a detailed description thereof will be omitted.

Next, the controller 80 controls the injection module 40 to inject the reducing agent according to the reducing agent injecting amount at step S360. When the reducing agent is injected to the exhaust gas so that nitrogen oxide contained in the exhaust gas is removed in the SCR catalyst 60, the controller 80 returns to the step S345.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

While this invention has been described in connection with embodiments, it is to be understood that the invention is not limited to the disclosed embodiments. On the contrary, it is intended to cover various modifications and equivalent arrangements included within the spirit and scope of the appended claims.

What is claimed is:

1. A vehicle control system, comprising:
an engine including a combustion chamber configured to generate energy by burning an air-fuel mixture, an intake manifold configured to supply air to the combustion chamber, an injector configured to supply fuel to the combustion chamber and an exhaust manifold configured to discharge exhaust gas generated by burning the air-fuel mixture to an exhaust pipe;
a hybrid starter/generator (HSG) configured to start the engine or generate electricity using energy generated in the engine;
an injection module which is mounted in the exhaust pipe and injects a reducing agent to the exhaust gas;
a selective catalytic reduction (SCR) catalyst which is mounted in the exhaust pipe at a rear end of the injection module and reduces nitrogen oxide contained in the exhaust gas using the reducing agent; and
a controller which controls operations of the injector, the injection module, and the HSG,
wherein when a state of the engine is an idle state at the time of a cold start, the controller increases a load of the HSG by a predetermined load amount until a temperature of the SCR catalyst reaches a predetermined temperature,
wherein the predetermined load amount varies depending on a difference between the temperature of the SCR catalyst and the predetermined temperature.

2. The vehicle control system of claim 1, wherein the larger the difference between the temperature of the SCR catalyst and the predetermined temperature is, the larger the predetermined load amount is.

3. The vehicle control system of claim 1, wherein the difference between the temperature of the SCR catalyst and the predetermined temperature is divided into two or more temperature difference sections and the predetermined load amount in any one temperature difference section is constant.

4. The vehicle control system of claim 1, wherein when the engine operates at the time of the cold start, the controller determines whether an amount of nitrogen oxide contained in the exhaust gas is larger than a reference amount and when the amount of nitrogen oxide contained in the exhaust gas is larger than the reference amount, the controller controls the injection module to inject a reducing agent according to the amount of nitrogen oxide.

5. A vehicle control system, comprising:
an engine including a combustion chamber configured to generate energy by burning an air-fuel mixture, an intake manifold configured to supply air to the combustion chamber, an injector configured to supply fuel to the combustion chamber and an exhaust manifold configured to discharge exhaust gas generated by burning the air-fuel mixture to an exhaust pipe;
a hybrid starter/generator (HSG) configured to start the engine or generate electricity using energy generated in the engine;
an injection module which is mounted in the exhaust pipe and injects a reducing agent to the exhaust gas;
a selective catalytic reduction (SCR) catalyst which is mounted in the exhaust pipe at a rear end of the injection module and reduces nitrogen oxide contained in the exhaust gas using the reducing agent; and
a controller which controls operations of the injector, the injection module, and the HSG,
wherein when a state of the engine is an idle state at the time of a cold start, the controller increases a load of the HSG by a predetermined load amount until a temperature of the SCR catalyst reaches a predetermined temperature,
wherein when the engine operates at the time of the cold start, the controller determines whether an amount of nitrogen oxide contained in the exhaust gas is larger than a reference amount and when the amount of nitrogen oxide contained in the exhaust gas is larger than the references amount, the controller controls the injection module to inject a reducing agent according to the amount of nitrogen oxide, and
wherein the controller controls the HSG to generate at least some of a demand torque of a driver before injecting the reducing agent.

6. A vehicle control method for using a vehicle control system including an engine which generates energy by burning an air-fuel mixture and discharges exhaust gas generated during a combustion process of the air-fuel mixture, a hybrid starter/generator (HSG) configured to start the engine or generate electricity using energy generated in the engine, an injection module which injects a reducing agent to the exhaust gas, a selective catalytic reduction (SCR) catalyst which reduces nitrogen oxide contained in the exhaust gas using the reducing agent, and a controller which controls operations of the engine, the injection module, and the HSG, the vehicle control method comprising:
determining an engine state when a cold starting condition is satisfied;
determining whether a temperature of the SCR catalyst is lower than a first temperature when the engine is in an idle state;
increasing a load of the HSG by a first load when the temperature of the SCR catalyst is lower than the first temperature,
when the temperature of the SCR catalyst is equal to or higher than the first temperature determining whether the temperature of the SCR catalyst is higher than a second temperature,
increasing the load of the HSG by a second load which is smaller than the first load when the temperature of the SCR catalyst is equal to or lower than the second temperature; and
returning to the determining whether the temperature of the SCR catalyst is lower than the first temperature.

7. The vehicle control method of claim 6, further comprising:
when the temperature of the SCR catalyst is higher than the second temperature, returning to the determining of an engine state.

8. The vehicle control method of claim 6, further comprising:

additionally injecting fuel when the engine is in an idle state.

9. The vehicle control method of claim 6, further comprising:
when the engine operates not in an idle state, determining whether an amount of nitrogen oxide contained in the exhaust gas is larger than a reference amount;
calculating a reducing agent injecting amount according to the amount of nitrogen oxide when the amount of nitrogen oxide contained in the exhaust gas is larger than the reference amount; and
injecting the reducing agent according to the calculated reducing agent injecting amount.

10. The vehicle control method of claim 9, further comprising:
when an amount of nitrogen oxide contained in the exhaust gas is larger than the reference amount, generating at least some of a demand torque of a driver by the HSG before the injecting of a reducing agent.

\* \* \* \* \*